United States Patent [19]

Nakazawa et al.

[11] 4,332,412
[45] Jun. 1, 1982

[54] ACCESSORY MOLDING STRIP

[75] Inventors: Takaaki Nakazawa, Toyota; Takenori Nagata, Chiryu; Yasuo Kuroda, Kariya; Toshio Suzuki, Okazaki, all of Japan

[73] Assignee: Aisin Seiki Kabushiki Kaisha, Kariya, Japan

[21] Appl. No.: 168,485

[22] Filed: Jul. 14, 1980

Related U.S. Application Data

[63] Continuation of Ser. No. 27,293, Apr. 5, 1979, abandoned, and a continuation of Ser. No. 852,934, Nov. 18, 1977, abandoned, which is a continuation of Ser. No. 675,914, Apr. 12, 1976, abandoned.

[30] Foreign Application Priority Data

Apr. 25, 1975 [JP] Japan .................................. 50-51126

[51] Int. Cl.³ .............................................. B62D 27/00
[52] U.S. Cl. ....................................... 296/29; 52/208; 296/84 D; 296/93
[58] Field of Search ..................... 296/29, 28 R, 84 R, 296/84 D, 93; 52/211, 208, 212, 400, 403; 293/71 R, 63

[56] References Cited

U.S. PATENT DOCUMENTS

| 3,189,143 | 6/1965 | Adams | 296/63 |
| 3,338,007 | 8/1967 | Draplin | 52/208 |
| 3,811,989 | 5/1974 | Hearn | 293/63 |
| 3,841,680 | 10/1974 | Muller | 293/63 |

Primary Examiner—Joseph F. Peters, Jr.
Assistant Examiner—John A. Carroll
Attorney, Agent, or Firm—Finnegan, Henderson, Farabow, Garrett & Dunner

[57] ABSTRACT

An accessory molding strip for motor vehicle bodies comprising an at least partially exposed wrapping member made of stainless steel, and a reinforcing member made of plastic and bonded to the rear surface of the wrapping member throughout the length of the wrapping member.

2 Claims, 5 Drawing Figures

ACCESSORY MOLDING STRIP

This is a continuation of application Ser. No. 27,293, filed April 5, 1979 as a continuation of Ser. No. 852,934 filed Nov. 18, 1977, which was a continuation of application Ser. No. 675,914 filed April 12, 1976 (Abandoned).

BACKGROUND OF THE INVENTION

1. Field of the Invention

The present invention relates generally to an accessory molding strip for motor vehicle bodies and more particularly to an accessory molding strip composed of metal and plastic.

2. Description of the Prior Art

An accessory molding strip for motor vehicle bodies composed of more than one material has been used in the past to lighten weight. For example, the use of plastic with aluminum may reduce the specific gravity under half of the metal alone. Additionally, the use of plastic conserves the natural resources of metals, such as aluminum and stainless steel, and is less expensive under present social objectives.

However, in conventional molding strip utilizing metal and plastic, a metal, such as aluminum foil is covered by transparent plastic. In such usage the luster of stainless steel cannot be obtained, and a cheap-looking appearance is presented. An adhesive must be used to attach the transparent plastic to the aluminum foil. Over a period of time discoloration appears between the aluminum foil and the transparent plastic. Accordingly, such a conventional molding strip does not have a desirable luster when new and becomes quite objectionable with the passage of time.

The present invention overcomes the above-mentioned conventional drawbacks by bonding a reinforcing member made of plastic to a rear surface of an outer wrapping plate made of stainless steel.

SUMMARY OF THE INVENTION

The present invention provides an improved accessory molding strip utilizing an exposed outer wrapping plate of stainless steel supported by a reinforcing member made of plastic permanently attached thereto.

The accessory molding strip according to the present invention is unique and highly simplified.

The foregoing and other objects, features and advantages of the invention will be apparent from the following more particular description of preferred embodiments of the invention as illustrated in the accompanying drawings.

BRIEF DESCRIPTION OF THE DRAWINGS

The accompanying drawings, which are incorporated in and constitute a part of this specification, illustrate embodiments of the invention and, together with the description, serve to explain the principles of the invention.

DETAILED DESCRIPTION OF THE PREFERRED EMBODIMENTS

Reference will now be made in detail to the present preferred embodiments of the invention, examples of which are illustrated in the accompanying drawings.

Figure 1:
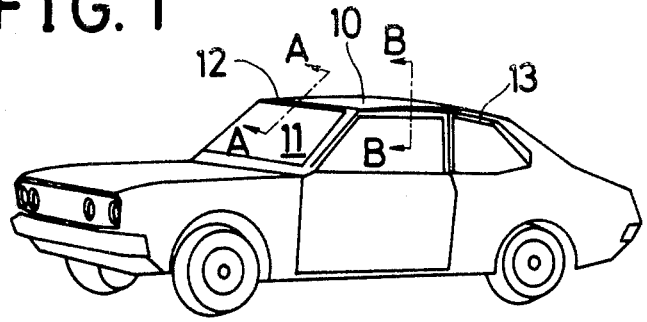
FIG. 1 is a perspective view of a motor vehicle showing a window molding strip and roof molding strip.

Referring now to the drawings, particularly to FIG. 1 thereof, a motor vehicle body 10 has window glass 11 with window molding strip 12. Roof molding strip 13 extends along a roof line of the vehicle.

Figure 2:
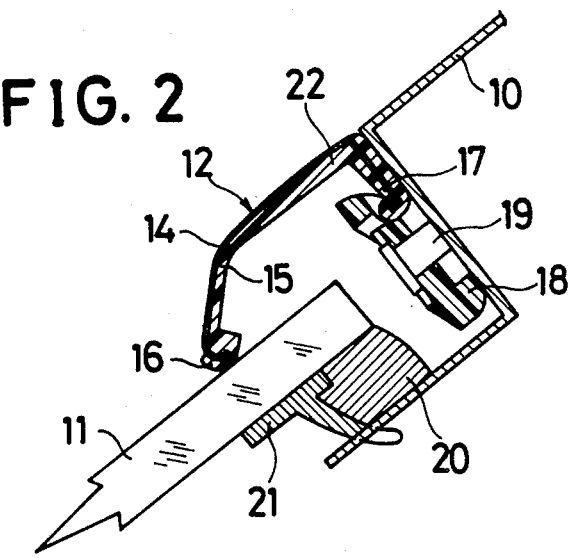
FIG. 2 is an enlarged sectional view taken along the line A—A of FIG. 1 according to the invention.

According to the invention, the window molding strip 12, as shown in FIG. 2, includes a wrapping plate 14 made of stainless steel, a reinforcing member 15 made of plastic and permanently fixed, as by bonding, along the rear surface of the wrapping plate 14. One edge portion 16 of the plate 14 is curved and covered by the reinforcing member 15 so as to support the window glass 11 without damaging the glass. The other edge portion 17 of the plate 14 is bent at approximately a right angle to correspond to the surface of the vehicle body 10. The plastic member 15 wraps around the edge 17 of the steel plate 14 and provides a cushion between the steel plate and the body 10 to avoid friction and wear therebetween with possible resulting rust to the body. The main body portion 22 of the plate 14 between the edge portions 16, 17, extends outwardly from the metal and glass of the motor vehicle body and is self-supporting.

As embodied herein, a stud 19 is attached to the vehicle body 10 to support a plastic clip 18 as known in the art. The edge portion 17 of the stainless steel plate 14 with its surrounding cover of the plastic member 15 is wedged under one end of the clip 18 for attaching the molding strip 12 to the motor vehicle body. The portions of the molding strip 12 contacting the glass and metal of the motor vehicle body are formed of plastic and inhibit friction, noise and wear.

As known in the art, the inner face of the window glass 11 is adhered to the motor vehicle body 10 by a seal member 21 formed by elastic material and a body 20 of adhesive.

The thickness of the plastic of the reinforcing member 15 may be easily increased at critical points, such as an extended body portion 22, to give desirable support to the stainless steel wrapping plate and the desired strength to the stiffness of the molding strip 12.

Since the exposed portion of the molding strip 12 is substantially all stainless steel the luster of the molding strip is not reduced. However, the thickness and weight of the stainless steel can be minimized.

Figure 3:
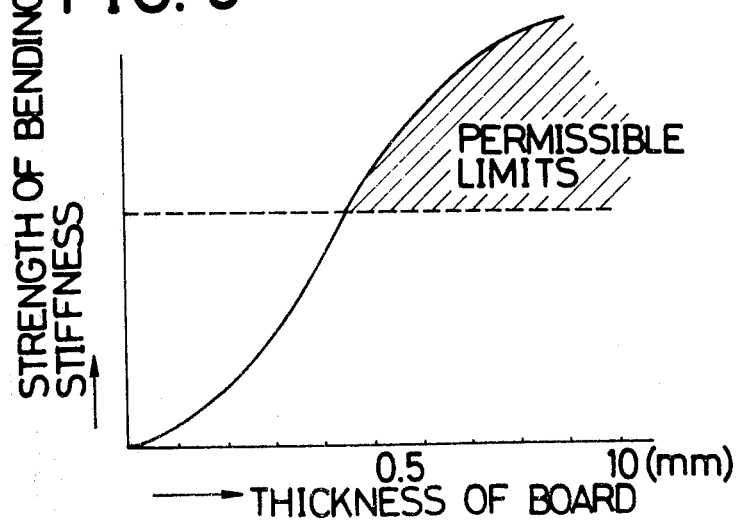
FIG. 3 is a graphical view showing relative thickness of board and strength of bending stiffness in conventional molding strip.

As shown in the graph of FIG. 3, the thickness of the metal sheet utilized in conventional molding strip must be, at a minimum, in the range of 0.4~0.5 mm. In general, when stainless steel is used, a board (sheet) having a thickness in the range of 0.4~0.7 mm is utilized to be within the permissible limits of bending strength. However, when the molding strip is composed only of metal the molding strip may become inordinately expensive.

In our invention, the thickness of the sheet of wrapping plate 14 made of stainless steel is about 0.2 mm and the strength of stiffness is provided at the rear by the plastic reinforcing member 15. The thickness of the reinforcing member 15 can be easily enlarged, particularly at the part requiring the strength upon projecting and forming the plastic, if necessary, without changing the thickness of the stainless steel sheet. Accordingly, the lightness in weight and the low cost of the molding strip 12 can be attained.

In accordance with the invention, an accessory molding strip utilizing a stainless steel wrapping plate and a plastic reinforcing member may be fixed in a weather strip around the window glass of a motor vehicle.

Figure 4:
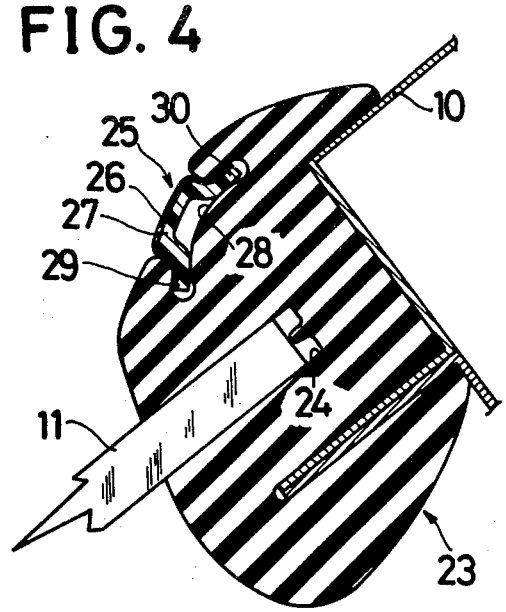
FIG. 4 is a view similar to FIG. 2, showing a second embodiment according to the invention.

Referring to FIG. 4, the window glass is supportingly inserted into a groove 24 formed in a weather strip 23 which is attached to the vehicle body 10 as known in the art. As embodied herein, the window molding strip 25 is substantially U-shaped and includes a wrapping plate 26 made of stainless steel and a reinforcing member 27 made of plastic fixedly attached along the rear surface of wrapping plate. The edge portions 29, 30 of molding strip 25 are fixedly inserted into a groove 28, having substantially a T-shape, formed in the weather strip 23. The main body portion of the molding strip 25, between the edge portions 29, 30, extends outwardly from the weather strip 23 and is self-supporting.

In this embodiment the luster of stainless steel is provided with light weight and low cost. In addition, the elastic material of the weather stripping 23 can be attached to the motor vehicle body 10 without vibration with its attendant possibility of body damage and rust.

This embodiment of the invention is also suitable as a side molding strip, locker molding strip, etc.

Figure 5:
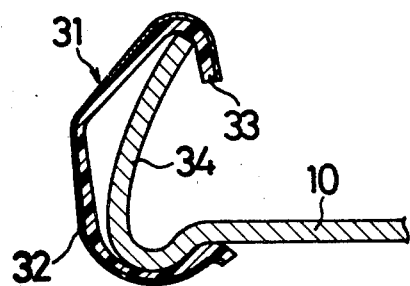
FIG. 5 is an enlarged view taken along the line B—B of FIG. 1, showing a third embodiment according to the invention.

In accordance with the invention, as shown in FIG. 5, a roof molding strip incorporates a stainless steel wrapping plate with a plastic reinforcement.

A roof molding strip 31 includes a stainless steel wrapping plate 32 in substantially a C-shape and a plastic reinforcing member 33 fixedly attached along the rear surface of the wrapping plate. The molding strip 31 is snapped on to an arcuate projecting portion 34 of the roof of the body 10 by utilizing the elasticity of molding strip 31. The main body portion of the molding strip 31 extends outwardly from the projecting portion 34 of the roof and is self-supporting.

The stainless steel wrapping plate of the molding strip 31 is insulated from the roof portion 34 by the plastic reinforcing member 33, thus inhibiting friction and development of rust.

Obviously, many modifications and variations of the present invention are possible in light of the above teachings. It is to be understood, therefore, that within the scope of the appended claims the present invention may be practised otherwise than as specifically described herein.

What is claimed is:

1. An accessory molding strip for a motor vehicle window comprising:

an elongated wrapping member made of stainless steel of about 0.2 mm in thickness for extending at least along one side of the window and bridging between the window and the body of the vehicle, an edge of said member for positioning adjacent said window being curved inwardly for resting against the window, the opposite edge for positioning adjacent the vehicle body having a portion bent approximately 90° from the main body portion of the wrapping member for substantially parallelling the body of the vehicle; and a plastic reinforcing member permanently affixed to the rear surface of said wrapping member, said reinforcing member extending around said curved edge and forming a cushion between said curved edge and the window, and extending around the free edge of said bent portion and along the front surface of said bent portion, forming a protective cushion between the front surface of said bent portion and the body of the vehicle, said wrapping member and said reinforcing member being self-supporting between said curved edge and said bent portion.

2. The accessory molding strip of claim 1 wherein the body of said vehicle includes a stud-supported plastic clip and wherein the reinforcing member extending around said free edge of said bent portion is shaped for wedging under said plastic clip.

* * * * *